United States Patent [19]

Cohen

[11] Patent Number: 5,031,513
[45] Date of Patent: Jul. 16, 1991

[54] AIRFLOW CONTROL SYSTEM FOR A POD

[75] Inventor: Mordechai Cohen, San Diego, Calif.

[73] Assignee: Sundstrand Corporation, Rockford, Ill.

[21] Appl. No.: 419,946

[22] Filed: Oct. 11, 1989

[51] Int. Cl.⁵ .......................... B64D 13/00; B60H 1/32
[52] U.S. Cl. ......................................... 98/1.5; 98/2.01;
 62/241; 165/40
[58] Field of Search ........................... 98/1, 1.5, 2.01;
 165/122, 40; 62/241

[56] References Cited
U.S. PATENT DOCUMENTS

| | | | |
|---|---|---|---|
| 2,324,236 | 7/1943 | Price | 98/1.5 |
| 2,585,295 | 2/1952 | Baak | 98/1.5 |
| 2,659,534 | 11/1953 | Smith | 236/9 R |
| 3,845,700 | 11/1974 | Lefeuvre | 98/2.01 |
| 3,847,298 | 11/1974 | Hamilton | 137/209 |
| 4,399,665 | 8/1983 | Evans et al. | 62/239 |
| 4,566,373 | 1/1986 | Ohashi | 98/2.01 |

Primary Examiner—Albert J. Makay
Assistant Examiner—W. Doerrler
Attorney, Agent, or Firm—Antonelli, Terry, Stout & Kraus

[57] ABSTRACT

An airflow control system (10) in accordance with the invention includes an air channel (14) having a single opening (16) for receiving ram air and for inducting air into the channel; a fan assembly (20) disposed within the air channel including a fan which is activated for inducting air through the air channel and through a fan channel (30) disposed within the air channel, the fan having an inlet (42) in the fan channel and an outlet (44); and a mechanism (50) responsive to ram air within the air channel for closing the outlet to at least lessen freewheeling of the fan which would occur if the fan channel was open for passage of ram air and responsive to induction of air by the fan into the channel to cause the inlet and the outlet to be open.

24 Claims, 3 Drawing Sheets

AIRFLOW CONTROL SYSTEM FOR A POD

DESCRIPTION

1. Technical Field

The present invention relates to airflow control systems in pods in airframes. More specifically, the present invention relates to systems for controlling airflow through a pod which utilizes ram air during flight for cooling of avionics contained in the pod and fan inducted air for cooling of avionics while the airframe is on the ground.

2. Background Art

In the LANTIRN (Low Altitude Navigation and Targeting Infrared Night), a pod contained an environmental control unit (ECU) for cooling. The ECU contained an evaporative cooling system. The condenser of the cooling system was cooled by air from two sources. The first source was an opening for ram air. The second source was an opening for air induced by a fan to cool the condenser while the LANTIRN was on the ground. The two sources were in the configuration of a Y. A pivoting door blocked off the second source when ram air was present. A spring caused the first source to be blocked when ram air was not present and the cooling fan was running while the LANTIRN was on the ground. The LANTIRN pod did not couple ram air to the fan as a consequence of the fan not being located in a part of the Y receiving ram air. In the LANTIRN, the entire ECU cavity was subjected to cooling flow which caused dirt to collect on components and increased likelihood of mechanical failure.

U.S. Pat. No. 2,650,534 discloses an air circulating apparatus which provides air to the interior of a vehicle either from a blower or from ram air. Ram air is coupled to the interior of the car when the vehicle speed reaches a predetermined level which is sensed by a switch responsive to air pressure. This system is not concerned with overspeeding of the fan caused by ram air given the fact that ram air is not coupled to the fan.

U.S. Pat. No. 4,566,373 discloses a ventilation system for an automotive vehicle having a bypass passage around a blower providing vehicular ventilation to avoid flow resistance caused by the blower. The system is not concerned with preventing overspeeding of the blower caused by ram air.

DISCLOSURE OF INVENTION

The present invention provides an improved airflow control system for an air channel having a single opening for receiving ram air and inducted air. A fan is disposed in the air channel for inducting air in the absence of ram air. A mechanism prevents the fan from being overspeeded by ram air. With the invention, at least one pivotable door assembly rotates to a position in response to ram air to block the flow of ram air axially through a fan channel of the fan assembly to prevent overspeeding of the fan and further in response to induction of air into the air channel by the fan rotates to a position to permit air to flow unrestricted axially through the fan channel. The pivoting of the door assembly is completely controlled by ram air flow and inducted airflow from the fan for moving the doors of the assembly between first and second positions which respectively block the flow of air axially through the fan channel and permit airflow through a ram air channel and which permit air to flow axially through the fan channel and block the flow of air through the ram air channel.

Furthermore, the invention provides an airflow control for use in a pod of an airframe which contains an evaporative cooling system for cooling electronics within the pod. The invention provides for a high efficiency heat exchange between a condenser located upstream in the air channel and the ram air or air inducted in the channel while preventing overspeeding of the fan assembly during ram air cooling of the condenser. Location of the fan downstream from the condenser results in the use of less electrical power to cool the condenser than when the fan is located upstream of the condenser as a consequence of the greater efficiency of the fan sucking air through the condenser and further the heat generated by the fan not adding additional heat to the airstream which is cooling the condenser. As a result, the fan may be smaller and lighter which is of importance in airframes. Furthermore, the fan may be made less noisy as a consequence of the impeller of the fan being disposed away from the external housing of the pod and further no screen being present at the fan inlet. Mounting of the fan assembly is simplified as a consequence of a frame mount of the fan being possible eliminating attachment of the fan assembly to panels of the pod. Furthermore, the air channel which receives ram air and air induced into the air channel does not contain all of the components of the pod, such as avionics which require cooling, simplifying the construction of the pod in that airflow through the air channel is not required to be through the entire interior of the pod which eliminates the problem of the prior art from cooling the entire ECU cavity involving dirt collecting on components and mechanical failure. Additionally, maintenance of the fan may be performed without the panels defining the pod being on. Finally, since the fan is mounted on a frame and not on the panels of the pod, there is no need for a long wire harness to the electric motor of the fan.

An airflow control in accordance with the present invention includes an air channel having a single opening for receiving ram air and for inducting air into the channel and having a cross-section including a fan channel and a ram air channel a fan assembly including a fan disposed within the fan channel which is activated for inducting air through the air channel and through the fan channel disposed within the air channel, the fan having an inlet in the fan channel receiving inducted air and an outlet for discharging inducted air; and a mechanism, responsive to the ram air within the remain channel for closing the outlet to at least lessen freewheeling of the fan which would occur if the fan channel was open for passage of ram air and responsive to induction of air by the fan into the fan channel to cause the and outlet to be open. The fan assembly includes a shroud defining the inlet and outlet of the fan channel and the air channel is disposed in a pod of an airframe.

The mechanism comprises at least one pivotally mounted door assembly pivoted on the fan assembly having first and second doors which extend from the pivot point and subtend an angle. Each first door blocks flow of air through the ram air channel and each second door does not block flow of air through the fan channel when ram air is not present. Each first door permits ram air through the ram air channel and each second door blocks flow of air through the fan channel when ram air is present.

The invention further includes a condenser of a cooling system disposed between the opening of the air channel and the inlet of the fan and an air deflection surface disposed within the air channel between an outer surface of the shroud of the fan assembly and an inner wall of the air channel which is inclined with respect to an axially direction of flow of air in the air channel for deflecting flow of air in the air channel toward the ram air channel.

BEST MODE FOR CARRYING OUT THE INVENTION

Figure 1:
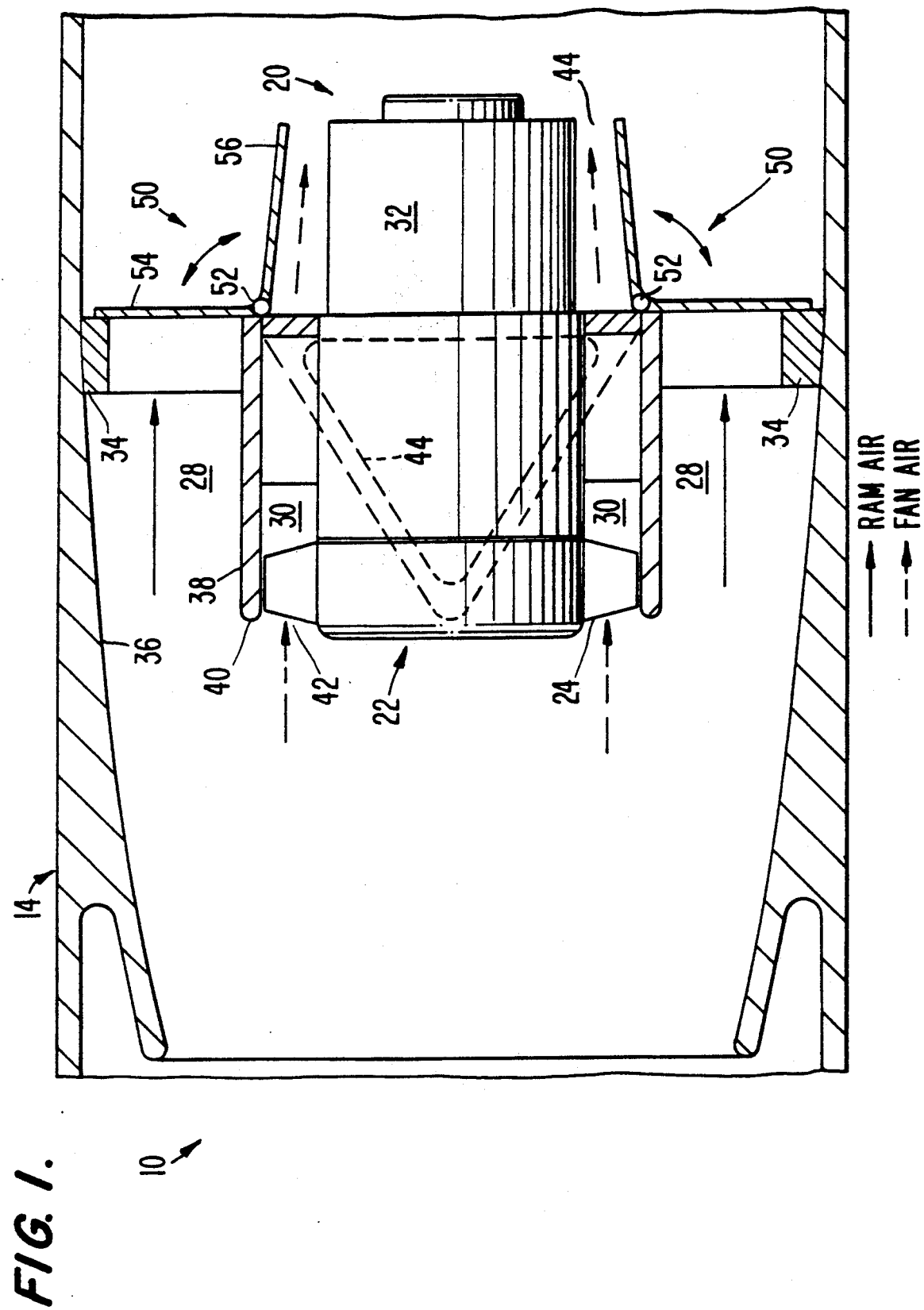
FIG. 1 illustrates a partial longitudinal sectional view of an airflow control system in accordance with the present invention.
Figure 2:
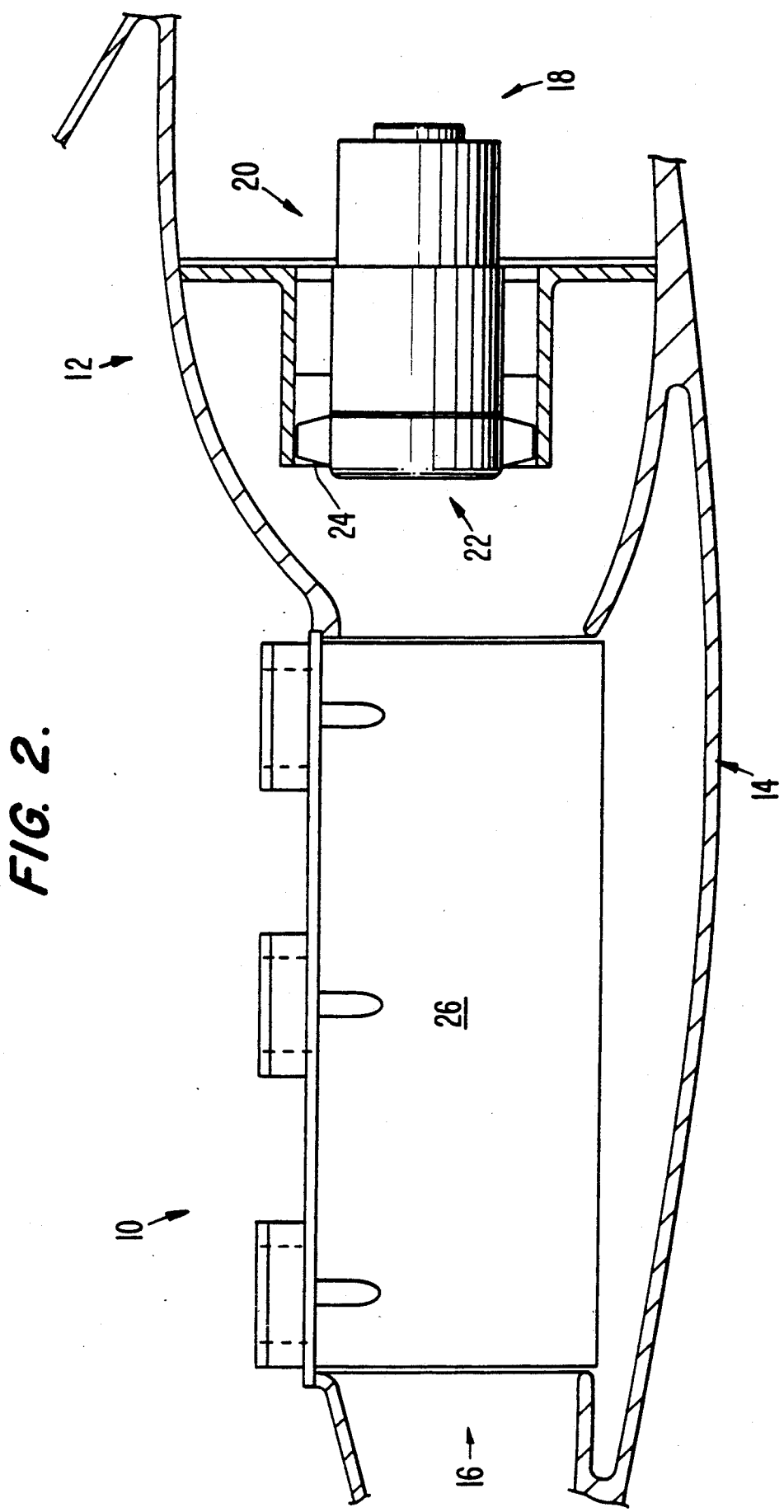
FIG. 2 illustrates an elongated sectional view of an airflow control system of the present invention including a condenser located upstream of the fan assembly rotated 90° with respect to FIG. 1.
Figure 3:
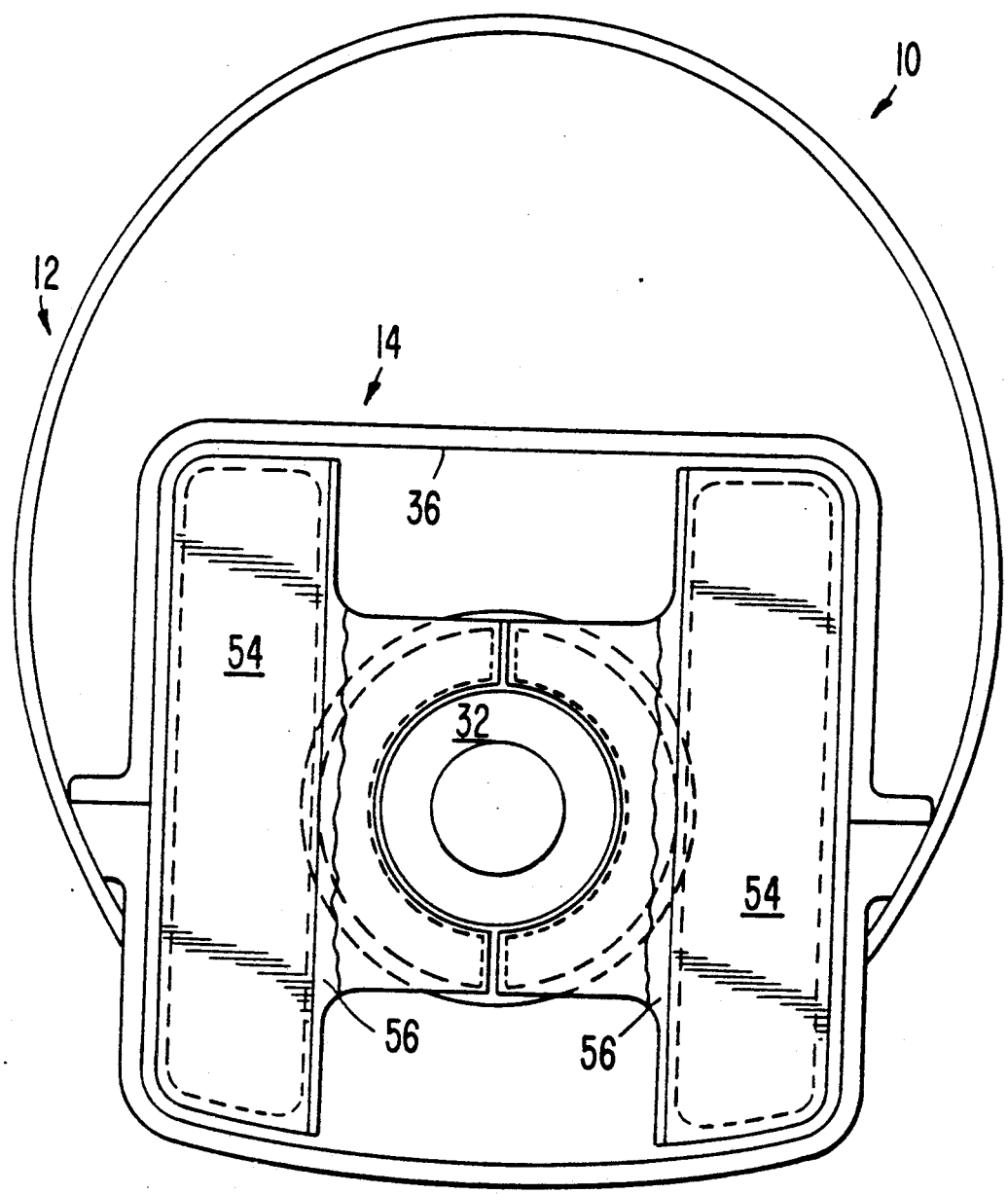
FIG. 3 illustrates an end view of an outlet of the fan assembly of the present invention.

FIGS. 1-3 illustrate an embodiment of an airflow control system 10 in accordance with the present invention. Like reference numerals identify like parts throughout the drawings. The preferred application of the present invention is in a pod 12 of an airframe which includes an air channel 14 through which air flows. The air channel 14 has single inlet 16 and an outlet 18 as illustrated in FIG. 2. It should be understood that the whole structure of the inlet 16 and 18 has been truncated for purposes of illustration.

Two types of air flow through the air channel 14. Ram air is forced into the inlet 16 when there is relative motion of the pod 12 which intercepts air at the inlet creating a ram airflow through the air channel which is discharged by outlet 18. Air is also induced into the inlet 16 through the air channel 14 and out of the outlet 18 by rotation of a fan contained in a fan assembly 20 which includes an impeller 22 having a plurality of blades 24 mounted thereon. Airflow through the air channel 14 is for purposes of heat exchange between a heated working fluid (not illustrated) flowing through a condenser 26 illustrated in FIG. 2 which is part of an evaporative cooling mechanism utilized for cooling avionics disposed in another portion of the pod 12 (not illustrated). The function and structure of the condenser 26 is conventional and will not hereinafter be discussed. It should be noted that the sectional view of FIG. 2 with respect to the fan assembly 20 is rotated 90° from the sectional view of FIG. 1 of the fan assembly.

At the axial location of the fan assembly 20, the airflow channel 14 is comprised of one or more ram air channels 28 and one or more fan channels 30. The number of channels 28 and 30 may be varied depending on the cooling requirements of the pod. As illustrated, a pair of ram air channels 28 and fan channels 30 are utilized. The operation of the present invention causes the ram air channels 28 to be opened and the fan channels 30 to be closed in the presence of ram air and in the absence of ram air and in the presence of air induced into the inlet 16 by applying electrical power to the motor 32 of the fan assembly by an electrical conductor (not illustrated) causes the ram air channels to be closed and the fan channels to be opened to provide efficient airflow through the condenser 26 creating a high efficiency heat exchange between the working fluid in the condenser and the air flowing through the condenser in the air channel 14 for ground operation and flight operation.

The fan assembly 20 is comprised of a conventional fan containing electric motor 32 having an output shaft (not illustrated) to which is attached impeller 22. The fan assembly 20 is attached in the air channel 14 by a frame 34 which is joined to an inner wall 36 of the air channel 14 and an outer peripheral surface 38 of a fan shroud 40 which defines an inlet 42 and an outlet 44 of the air channel 30. The conical surface 44 indicated in phantom is an air deflection surface disposed within the air channel 14 between the outer peripheral surface 38 of the shroud 40 of the fan assembly 20 and the inner wall 36 of the air channel which is inclined with respect to an axial direction of flow of air in the air channel for deflecting flow of air in the air channel toward the ram air channel 28 to provide for efficient non-turbulent airflow through the ram air channel. It should be understood that the air deflection surface 44 is disposed on both sides of the fan assembly 44 (inside and outside of the plane of FIG. 1).

The airflow control mechanism is comprised of a door assembly 50 associated with each of the ram air channels 28 and fan channels 30. The door assembly 50 is pivotally mounted to the fan assembly 20 at pivot point 52. Each door assembly 50 has a first door 54 and a second door 56 which subtends an angle which is slightly greater than 90° as illustrated in FIG. 1 to produce additional force on the door assembly to maintain the respective positions the door assembly in response to ram air or induced air flow without chatter. Each first door 54 blocks flow of air through the ram air channel 28 and each second door 56 does not block flow of air through the fan channel 30 when ram air is present in the channel 14 and each first door permits flow of ram air through the ram air channel and each second door blocks flow of air through the fan channel when ram air is present in the air channel. It should further be understood that any number of door assemblies may be utilized in the practice of the present invention with the door assemblies not being limited to the implementation as illustrated as long as they provide for the selective blocking of the ram air channel(s) 28 and the fan channel(s) 30 so that the flow of air through the air channels is blocked while ram air is present to prevent the potentially destructive overspeeding of the impeller 22 of the fan assembly 20. Torsion springs (not illustrated) bias the door assemblies 50 to the position as illustrated in FIG. 1.

While the invention has been described in terms of its preferred embodiment, it should be understood that numerous modifications may be made thereto without departing from the spirit and scope of the present invention. For example, while the preferred environment of the present invention is in a pod of an airframe, it should be understood that the invention may be utilized in other environments in which it is desirable to prevent overspeeding of an induction fan which is mounted in a single air channel which is also coupled to ram air. It is intended that all such modifications fall within the scope of the appended claims.

I claim:

1. An airflow control comprising:
   an air channel having a single opening for receiving ram air and for inducting air into the air channel and having a cross section including a fan channel and a ram air channel;

fan assembly including a fan disposed within the fan channel which is activated for inducting air through the air channel and through the fan channel disposed within the air channel, the fan having an inlet in the fan channel receiving inducted air and an outlet for discharging inducted air; and means, responsive to ram air within the ram air channel, for closing the outlet to at least lessen freewheeling of the fan which would occur if the fan channel was open for passage of ram air and responsive to induction of air by the fan into the fan channel to cause the outlet to be open.

2. An air flow control in accordance with claim 1 wherein the fan assembly further comprises:
a shroud defining the inlet and outlet of the fan channel.

3. An air flow control in accordance with claim 1 wherein the means comprises:
at least one pivotally mounted door assembly pivoted on the fan assembly having first and second doors which extend from the pivot point and subtend an angle, each first door blocking flow of air through the ram air channel and each second door not blocking flow of air through the fan channel when ram air is not present and each first door permitting flow of ram air through the ram air channel and each second door blocking flow of air through the fan channel when ram air is present.

4. An airflow control in accordance with claim 1 wherein:
the airflow control is disposed in a pod of an aircraft.

5. An airflow control in accordance with claim 2 wherein:
the airflow control is disposed in a pod of an aircraft.

6. An airflow control in accordance with claim 3 wherein:
the airflow control is disposed in a pod of an aircraft.

7. An airflow control in accordance with claim 1 further comprising:
a condenser of a cooling system disposed between the opening of the air channel and the inlet of the fan.

8. An airflow control in accordance with claim 2 further comprising:
a condenser of a cooling system disposed between the opening of the air channel and the inlet of the fan.

9. An airflow control in accordance with claim 3 further comprising:
a condenser of a cooling system disposed between the opening of the air channel and the inlet of the fan.

10. An airflow control in accordance with claim 4 further comprising:
a condenser of a cooling system disposed between the opening of the air channel and the inlet of the fan.

11. An airflow control in accordance with claim 5 further comprising:
a condenser of a cooling system disposed between the opening of the air channel and the inlet of the fan.

12. An airflow control in accordance with claim 6 further comprising:
a condenser of a cooling system disposed between the opening of the air channel and the inlet of the fan.

13. An airflow control in accordance with claim 1 further comprising:
an air deflection surface disposed within the fan channel between an outer surface of a shroud of the fan assembly and an inner wall of the ram air channel which is inclined with respect to an axial direction of flow of air in the air channel for deflecting flow of air in the fan channel toward the ram air channel.

14. An airflow control in accordance with claim 2 further comprising:
an air deflection surface disposed within the fan channel between an outer surface of the shroud of the fan assembly and an inner wall of the ram air channel which is inclined with respect to an axial direction of flow of air in the air channel for deflecting flow of air in the fan channel toward the ram air channel.

15. An airflow control in accordance with claim 3 further comprising:
an air deflection surface disposed within the fan channel between an outer surface of a shroud of the fan assembly and an inner wall of the ram air channel which is inclined with respect to an axial direction of flow of air in the air channel for deflecting flow of air in the fan channel toward the ram air channel.

16. An airflow control in accordance with claim 4 further comprising:
an air deflection surface disposed within the fan channel between an outer surface of a shroud of the fan assembly and an inner wall of the ram air channel which is inclined with respect to an axial direction of flow of air in the channel for deflecting flow of air in the fan channel toward the ram air channel.

17. An airflow control in accordance with claim 5 further comprising:
an air deflection surface disposed within the fan channel between an outer surface of the shroud of the fan assembly and an inner wall of the ram air channel which is inclined with respect to an axial direction of flow of air in the channel for deflecting flow of air in the fan channel toward the ram air channel.

18. An airflow control in accordance with claim 6 further comprising:
an air deflection surface disposed within the fan channel between an outer surface of a shroud of the fan assembly and an inner wall of the ram air channel which is inclined with respect to an axial direction of flow of air in the channel for deflecting flow of air in the fan channel toward the ram air channel.

19. An airflow control in accordance with claim 7 further comprising:
an air deflection surface disposed within the channel between an outer surface of a shroud of the fan assembly and an inner wall of the ram air channel which is inclined with respect to an axial direction of flow of air in the air channel for deflecting flow of air in the fan channel toward the ram air channel.

20. An airflow control in accordance with claim 8 further comprising:
an air deflection surface disposed within the fan channel between an outer surface of the shroud of the fan assembly and an inner wall of the ram air channel which is inclined with respect to an axial direction of flow of air in the air channel for deflecting flow of air in the fan channel toward the ram air channel.

21. An airflow control in accordance with claim 9 further comprising:
an air deflection surface disposed within the fan channel between an outer surface of a shroud of the fan assembly and an inner wall of the ram air channel which is inclined with respect to an axial direction of flow of air in the air channel for deflecting flow of air in the fan channel toward the ram air channel.

22. An airflow control in accordance with claim 10 further comprising:

an air deflection surface disposed within the fan channel between an outer surface of a shroud of the fan assembly and an inner wall of the ram air channel which is inclined with respect to an axial direction of flow of air in the air channel for deflecting flow of air in the fan channel toward the ram air channel.

23. An airflow control in accordance with claim 11 further comprising:

an air deflection surface disposed within the fan channel between an outer surface of the shroud of the fan assembly and an inner wall of the ram air channel which is inclined with respect to an axial direction of flow of air in the air channel for deflecting flow of air in the fan channel toward the ram air channel.

24. An airflow control in accordance with claim 12 further comprising:

an air deflection surface disposed within the fan channel between an outer surface of a shroud of the fan assembly and an inner wall of the ram air channel which is inclined with respect to an axial direction of flow of air in the air channel for deflecting flow of air in the fan channel toward the ram air channel.

* * * * *